United States Patent
Hua et al.

(10) Patent No.: US 9,240,056 B2
(45) Date of Patent: Jan. 19, 2016

(54) VIDEO RETARGETING

(75) Inventors: Gang Hua, Redmond, WA (US); Cha Zhang, Redmond, WA (US); Zhengyou Zhang, Redmond, WA (US); Zicheng Liu, Bellevue, WA (US); Ying Shan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1166 days.

(21) Appl. No.: 12/060,890

(22) Filed: Apr. 2, 2008

(65) Prior Publication Data

US 2009/0251594 A1    Oct. 8, 2009

(51) Int. Cl.
  H04N 7/01        (2006.01)
  H04N 11/20       (2006.01)
  G06K 9/20        (2006.01)
  G06T 11/00       (2006.01)
  H04N 1/387       (2006.01)
  H04N 21/2662     (2011.01)

(52) U.S. Cl.
  CPC .............. *G06T 11/00* (2013.01); *H04N 1/3875* (2013.01); *H04N 7/0122* (2013.01); *H04N 21/2662* (2013.01)

(58) Field of Classification Search
  CPC ........... H04N 21/2662; H04N 7/0117; H04N 7/0122; H04N 1/3872; H04N 1/3875
  USPC .......................................... 348/445; 382/282
  See application file for complete search history.

(56) References Cited

U.S. PATENT DOCUMENTS

| | | | |
|---|---|---|---|
| 6,535,620 B2* | 3/2003 | Wildes | G06T 7/206 382/107 |
| 8,005,316 B1* | 8/2011 | Linburn | G11B 27/034 345/1.1 |
| 8,024,768 B2* | 9/2011 | Berger | H04N 7/163 348/25 |
| 2002/0039138 A1* | 4/2002 | Edelson | G06T 3/0006 348/208.99 |
| 2006/0193509 A1* | 8/2006 | Criminisi | G06K 9/00241 382/154 |
| 2006/0253781 A1 | 11/2006 | Pea et al. | |
| 2007/0002183 A1 | 1/2007 | Fujibayashi et al. | |
| 2007/0016925 A1 | 1/2007 | Vaysman et al. | |
| 2007/0061862 A1* | 3/2007 | Berger | H04N 7/163 725/139 |
| 2007/0104382 A1 | 5/2007 | Jasinschi | |
| 2007/0257934 A1 | 11/2007 | Doermann et al. | |
| 2007/0297645 A1 | 12/2007 | Pace | |
| 2008/0007649 A1 | 1/2008 | Bennett | |
| 2008/0107186 A1* | 5/2008 | Brusnitsyn et al. | 375/240.28 |
| 2008/0260347 A1* | 10/2008 | Widdowson | 386/52 |

(Continued)

OTHER PUBLICATIONS

Setlur et al, "Retargeting Images and Video for Preserving Information Saliency", IEEE Computer Graphics and Applications, Published by the IEEE Computer Society, Sep./Oct. 2007, pp. 1-9.

(Continued)

*Primary Examiner* — James R Sheleheda
(74) *Attorney, Agent, or Firm* — Danielle Johnston Holmes; Steven Spellman; Micky Minhas

(57) ABSTRACT

Videos are retargeted to a target display for viewing with little to no geometric distortion or video information loss. Salient regions of video frames may be determined using scale-space spatiotemporal information. Video information loss may be a result of spatial loss, due to cropping, and resolution loss, due to resizing. A desired cropping window may be determined using a coarse-to-fine searching strategy. Video frames may be cropped with a window that matches an aspect ratio of the target display, and resized isotropically to match a size of the target display.

20 Claims, 9 Drawing Sheets

(56) References Cited

U.S. PATENT DOCUMENTS

2009/0085918 A1* 4/2009 Hollingworth ........... G06T 3/40 345/475
2011/0096228 A1* 4/2011 Deigmoeller et al. ........ 348/441

OTHER PUBLICATIONS

El-Alfy et al, "Multi-Scale Video Cropping", Proceedings of the 15th international conference on Multimedia, 2007, pp. 97-106.
Tao et al, "Active Window Oriented Dynamic Video Retargeting", Workshop on Dynamical Vision at ICCV , 2007, pp. 1-12.
Gleicher et al, "Re-Cinematography: Improving the Camera Dynamics of Casual Video", Proceedings of the 15th international conference on Multimedia, 2007, pp. 27-36.
Avidan et al, "Seam Carving for Content-Aware Image Resizing", ACM Transactions on Graphics, vol. 26, No. 3, SIGGRAPH 2007, pp. 1-9.
Chen et al, "A Visual Attention Model for Adapting Images on Small Displays", ACM Multimedia Systems Journal Nov. 2003, pp. 353-364.
Gal et al, "Feature-Aware Texturing", Proceedings of Eurographics Symposium on Rendering, 2006, pp. 297-303.
"Saliency Detection: A Spectral Residual Approach", IEEE Conf. on Computer Vision and Pattern Recognition, 2007, Jun. 2007, MN, USA, pp. 17-22.
Ltti et al, "A Model of Saliency-Based Visual Attention for Rapid Scene Analysis", vol. 20, Issue: 11, Nov. 1998, 1254-1259.
Kang et al, "Spacetime Video Montage", In Proceedings of IEEE International Conference on Computer Vision and Pattern Recognition (CVPR), vol. 2, pp. 1331-1338, Jun. 2006.
Liu et al, "Video Retargeting: Automating Pan and Scan", Proceedings of the 14th annual ACM international conference on Multimedia, Santa Barbara, CA, USA, 2006 , pp. 241-250.
"Automatic Browsing of Large Pictures on Mobile Devices", Proceedings of the eleventh ACM international conference on Multimedia, Berkeley, CA, USA, pp. 148-155.
"Learning to Detect a Salient Object", IEEE Conference on Computer Vision and Pattern Recognition, 2007. CVPR '07. Jun. 17-22, 2007, pp. 1-8.
Rui et al, "Automating Lecture Capture and Broadcast: Technology and Videography", vol. 10, No. 1 / Jun. 2004 pp. 3-15.
Setlur et al, "Automatic Image Retargeting", Conference Abstracts and Applications of ACM SIGGRAPH 2004. pp. 1-10.
Viola et al"Rapid Object Detection Using a Boosted Cascade of Simple Features", Conference on Computer Vision And Pattern Recognition 2001, pp. I-511-I-518 vol. 1.
He, et al, "The Virtual Cinematographer: A Paradigm for Automatic Real-Time Camera Control and Directing", Proceedings of the 23rd annual conference on Computer graphics and interactive techniques, 1996, pp. 217-224.
"Non-Homogeneous Content-Driven Video-Retargeting",Proceedings of the Eleventh IEEE International Conference on Computer Vision (ICCV-07), 2007, pp. 1-6.
Zhang et al, "Hybrid Speaker Tracking in an Automated Lecture Room", IEEE International Conference onMultimedia and Expo, 2005. ICME 2005, Jul. 6-8, 2005, pp. 1-4.
Herranz, et al., "Adapting surveillance video to smalldisplays via object-based cropping." In Proc. of International Workshop on Image Analysis for Multimedia Interactive Services, pp. 72-75, 2007.

\* cited by examiner

VIDEO RETARGETING

BACKGROUND

Videos are typically made up of a series of video frames that depict scenes and/or objects in a consecutive sequence of frames relative to time. Further, most videos traditionally have a standard aspect ratio designed to accommodate standard video displays for viewing. Additionally, most current videos are captured using a minimal standard for display resolution. Standard video displays for viewing videos have included televisions, projection devices, and other display monitors. Currently, a variety of display screens, having non-traditional display sizes and aspect ratios, are available and are capable of viewing videos.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Traditionally, videos have been viewed on displays designed specifically for the purpose of viewing videos. Hence, videos have traditionally been created conforming to a standard size and aspect ratio that can accommodate the traditional displays. Recently there has been an exponential growth of video availability, for example, through the Internet and sent by mobile devices. Further, there has been an exponential growth of non-traditional displays on devices that are capable of viewing video, for example, mobile computers (e.g., laptops), and mobile devices (e.g., cell phones, PDAs). These non-traditional displays may have screen sizes and aspect ratios that can not easily accommodate a video without some changes to the video. However, direct resizing of a video to a display with a different aspect ratio and display size, and other video retargeting techniques, often results in a poor viewing experience.

Users of videos on non-traditional displays may be less inclined to use these displays for viewing videos with a lot of content, or that may require a higher quality viewing experience. Therefore, it may be desirable to have a video retargeting method and system that can retarget a video to a target display while mitigating geometric distortion and loss of video information.

As provided herein, techniques and systems for retargeting video to a target display (e.g., a computer, application window, mobile phone) mitigate geometric distortion and loss of video information. The techniques and systems crop video frames from a video using a cropping window with a same aspect ratio as the target display. Salient content in the video may be determined, for example, by using combined phase spectrum information from both a temporal determination and a scale-space determination, generating saliency images for respective video frames. Once salient areas of the video are determined, cropping windows for the respective video frames are detected and tracked temporally. For example, a combined coarse-to-fine search may be performed on the saliency images, while improving a spatial information loss to resolution information loss ratio, generating desired cropping windows for the respective video frames. After desired cropping windows have been determined for respective video frames, for example, cropped video frames may be resized isotropically (e.g., scaled down while maintaining an aspect ratio) to match the target display.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
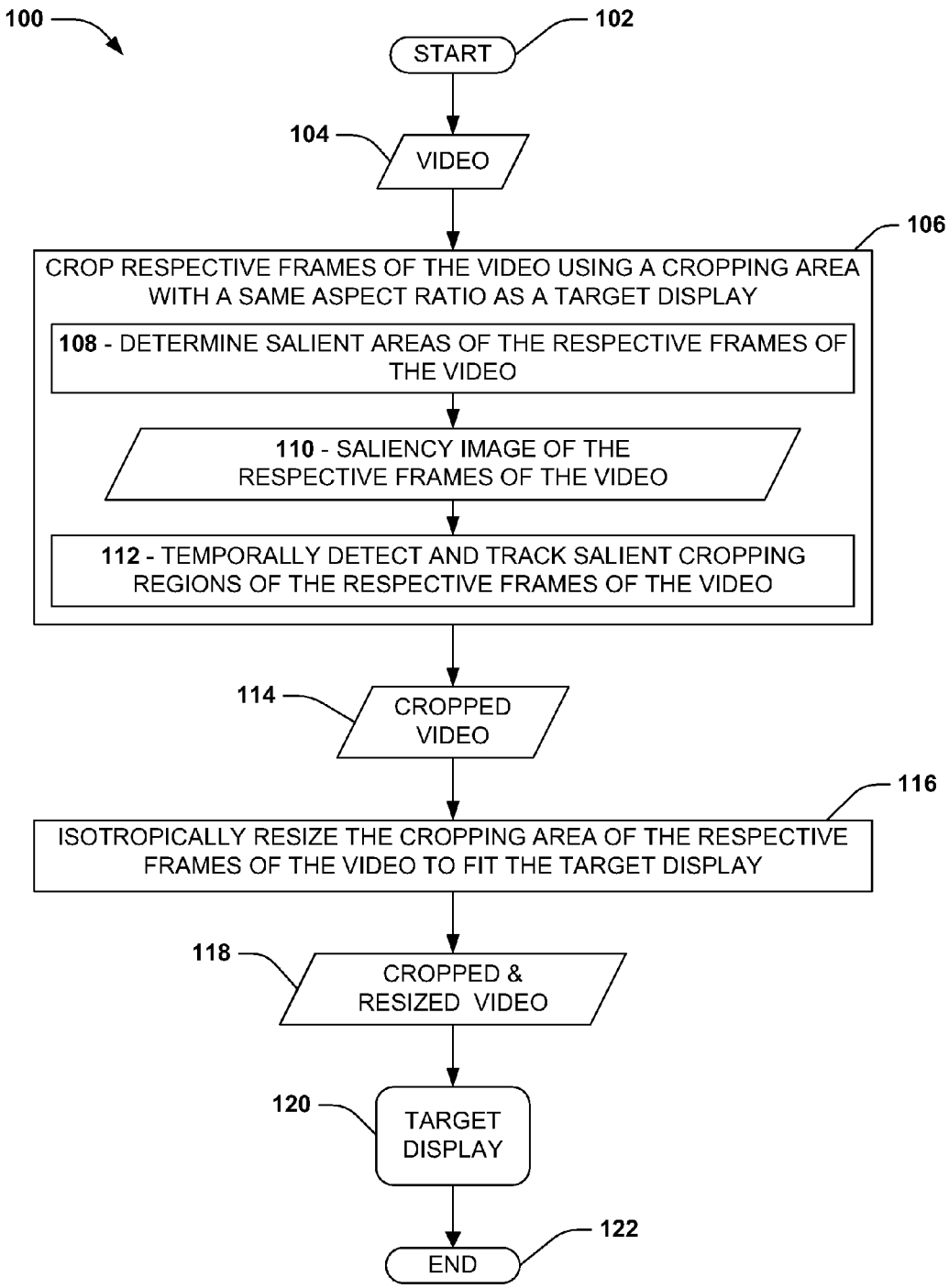
FIG. 1 is a flow diagram illustrating an exemplary method for retargeting a video to a target display.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

The purpose of video retargeting is to modify an existing video in order for it to be displayed on a target display having a different size and or aspect ratio than the video. Further, in order for video retargeting to be useful, the video should be displayed on the target display in a manner allows a viewer to view the video with minimal information loss and with little or no distortion. Currently, most video captured (e.g., with video cameras) and commonly available (e.g., on the Internet) has a resolution of 320×240 pixels or greater, commonly with a "standard" aspect ratio of 4:3 or 16:9. However, most mobile device displays have low resolution capabilities, with "non-standard" aspect ratios. Therefore, video retargeting is typically necessary for effective viewing of videos on mobile devices. While video retargeting can be applied to mobile viewing (e.g., mobile visual browsing online), it can also be adapted for other services involving smaller or larger displays (e.g., automated lecture services, intelligent video editing, and virtual directing).

Direct resizing of a video, for example, to a smaller display may not be desirable as video distortion may occur, or black bars (e.g., letterbox) may need to be added, which reduces display space. As mentioned above, for a better visual experience the retargeted video should preserve as much video content as possible while providing distortion-free viewing. Current techniques for retargeting video include, identifying salient areas of a video frame and anisotropically scaling a cropped image, and cutting pixel paths from an image and using interpolation for resizing. However, current techniques introduce geometric distortions due to anisotropic manipulation of the image pixels, and may have increased video information loss due to a lack of effective quantification of visual content.

Embodiments described herein relate to techniques and systems for video retargeting to a target display (e.g., a handheld device, a mobile phone), such that a video may be viewed on a target display having a different size and/or aspect ratio than the video, with limited or no geometric distortion and video information loss.

A method for video retargeting that mitigates geometric distortions and video information loss is illustrated in FIG. 1. An exemplary method 100 begins at 102 and involves cropping respective frames of a video 104 using a cropping area having the same aspect ratio as a target display at 106. It will be appreciated that while "the same aspect ratio" is referenced herein (including in the claims), "the same aspect ratio" is not intended to be interpreted in a limiting manner, but is also intended to comprise other closely related ratios, such as "a substantially similar aspect ratio", for example. The cropping begins at 108 and involves determining salient areas of the respective video frames to produce saliency images of the respective video frames. After saliency images 110 are determined, salient cropping regions of the saliency images for the respective video frames are temporally detected and tracked at 112. Cropping areas of respective cropped video frames 114 are isotropically resized to fit a target display at 116. Cropped and resized video frames may be sent to the target display 120, and the method 100 ends at 122.

In one embodiment of the method described above, effective quantification of a video's visual content may include determining saliency of visual content by extending spectral residual detection both temporally (e.g., using a consecutive sequence of video frames) and in scale space (e.g., using a series of differently scaled sizes of a video frame). Further, phase spectrum information of a video frame may be utilized for saliency detection. Additionally, in this embodiment, desired cropping windows may be determined and tracked temporally (e.g., searching for a cropping window that improves a ratio of video spatial information loss to video resolution information loss, then tracking desired cropping windows over a consecutive sequence of video frames). Also, the desired cropping windows may be rescaled isotropically (e.g., scaled down while keeping an aspect ratio of the cropping window) for respective video frames, in order to inhibit geometric distortion.

In one aspect of this embodiment, for example, a saliency image of a video's visual content may be generated by using spectral residual of a video frame. In this example, phase spectrum information of the video frame may be used, instead of magnitude spectral residual, to aid in computation speed of saliency detection. However, using phase spectrum information to determine saliency of a single video frame of one size may not always provide an effective saliency image. In this aspect, in order to generate an effective saliency image one may combine phase spectrum information from a consecutive sequence of video frames (temporally combined phase spectrum information). For example, a consecutive sequence of video frames may have a moving component (e.g., an item that is similar in color to its background) that may not be accounted for by phase spectrum information from one video frame but can be accounted for when the phase spectrum information for the consecutive sequence of video frames is combined. Further, one may combine phase spectrum information from a series of different scale sizes of a single video frame (scale-space combined phase spectrum information). For example, when a video frame is scaled down in size individual components in the video frame may become more, or less, pronounced due to resolution differences. Phase spectrum information from one video frame scale size may not account for these differences, while combining the phase spectrum information from a series of different scale sizes may account for these differences. In this aspect, one may then combine the phase spectrum information from temporally combined phase spectrum information and the scale-space combined phase spectrum information to generate an effective saliency image of the respective video frames.

In another aspect of this embodiment, for example, desired cropping windows may be determined for respective video frames of a video that account for salient areas of the video frames and provide a desired ratio of video spatial information loss (e.g., loss of the video frame's content) to video resolution information loss (e.g., loss of the video frame's resolution). In this aspect, a size of a cropping area of the video frame is inversely proportional to an amount of spatial information loss. For example, if the size of a cropping area of the video frame is small, the amount of spatial information loss may be large (e.g., if a cropping area of a video frame, having a resolution of 320×240, is 60×40 then over 95% of the video frame's spatial information may be lost). Further, in this aspect, the size of the cropping area is proportional to an amount of resolution information loss when scaling down the cropped area. For example, if the size of the cropping area is large the amount of resolution loss will be large when scaling down the cropped area. Therefore, in this aspect, it is desirable to determine the size of the cropping area of a video frame to account for both spatial information loss and resolution information loss of the eventual cropped and resized video frame. The spatial and resolution information loss are independent of each other, and can therefore be determined independently. A video information loss function may be represented:

$$L(V,\hat{V})=L_s(V,\hat{V})+\lambda L_r(V,\hat{V})$$

Where $L(V,\hat{V})$ is the video information loss, $L_s(V,\hat{V})$ is the spatial information loss, $L_r(V,\hat{V})$ is the resolution information loss, and $\lambda$ is a control parameter.

Desired cropping windows may be determined using a two-step searching and tracking approach. A coarse-to-fine strategy for detecting and tracking salient regions of the video frames may be utilized, comprising an efficient exhaustive coarse search and a gradient-based fine search. Although the coarse-to-fine search is a two-step process, respective steps may be performed simultaneously. An exhaustive coarse search may be performed over a solution space comprising a consecutive sequence of video frame saliency images. The coarse search my yield one or more coarse cropping windows, which coarsely determine a location of a desired cropping window for respective video frames. The gradient-based fine search is utilized to refine the cropping window. The fine search utilizes a gradient descent step with backtracking line search to determine the desired cropping window based on strategy described above.

Additionally, for example, there may be multiple salient areas of a video frames in some portions of a video. Multiple salient areas may not be properly accounted for by a single cropping window that attempts to account for both spatial information loss and resolution information loss of the eventual cropped and resized video frame. Therefore, it may be desirable to detect and track multiple salient regions of the video frames using the techniques described above. In this example, if multiple salient regions of the video frames are eventually cropped and resized for a target device, a "split-screen" display of the video frames may be utilized for viewing the multiple salient regions. In this example, multiple cropped and resized potions of the video frame may be viewed concurrently on the target display.

In another aspect of this embodiment, for example, smoothing may be applied to the respective cropping windows to inhibit a "jittering" effect between consecutive frames of cropped and resized video frames. During cropping and scaling of video frames, the portions of the video frames are removed by cropping and then scaled to a different size. This may create a "jittering" viewing affect caused by cropping and scaling of different areas and sizes of a video frame. To deter this affect, and create a more pleasing viewing experience, cropping parameters may be introduced that constrain the overall change in a cropping window between consecutive video frames. For example, a maximum zooming and motion speed, and a maximum zooming and motion acceleration speed, may be applied during cropping and resealing (e.g., a cropping window may not be allowed to move more than a designated amount in any one direction, or be allowed to change in size by a designated amount, between consecutive video frames). Further, an exponential moving average scheme may be applied, which utilizes a weighted average based on information from a consecutive sequence of video frames (e.g., information from older video frames count less toward the average, exponentially). Additionally, postprocessing (e.g., performing global fitting of smooth trajectories on parameters of a cropping window) may help to resolve any "jittering" not accounted for by the cropping parameters or a exponential moving average scheme.

In another aspect of this embodiment, for example, cropped video frames may be resized isotropically (e.g., maintaining an aspect ratio of an original window). In this aspect, after desired cropping windows have been determined for respective video frames, the cropping windows can be applied to respective video frames (e.g., the video frames can be cropped to the desired cropping window). In order for the cropped video frames to fit on a target display they may be resized to match a size of the target display. Because the cropping windows match the aspect ratio of the target display, resealing of the cropped video frames can be performed isotropically so that geometric distortion is limited.

Figure 2:
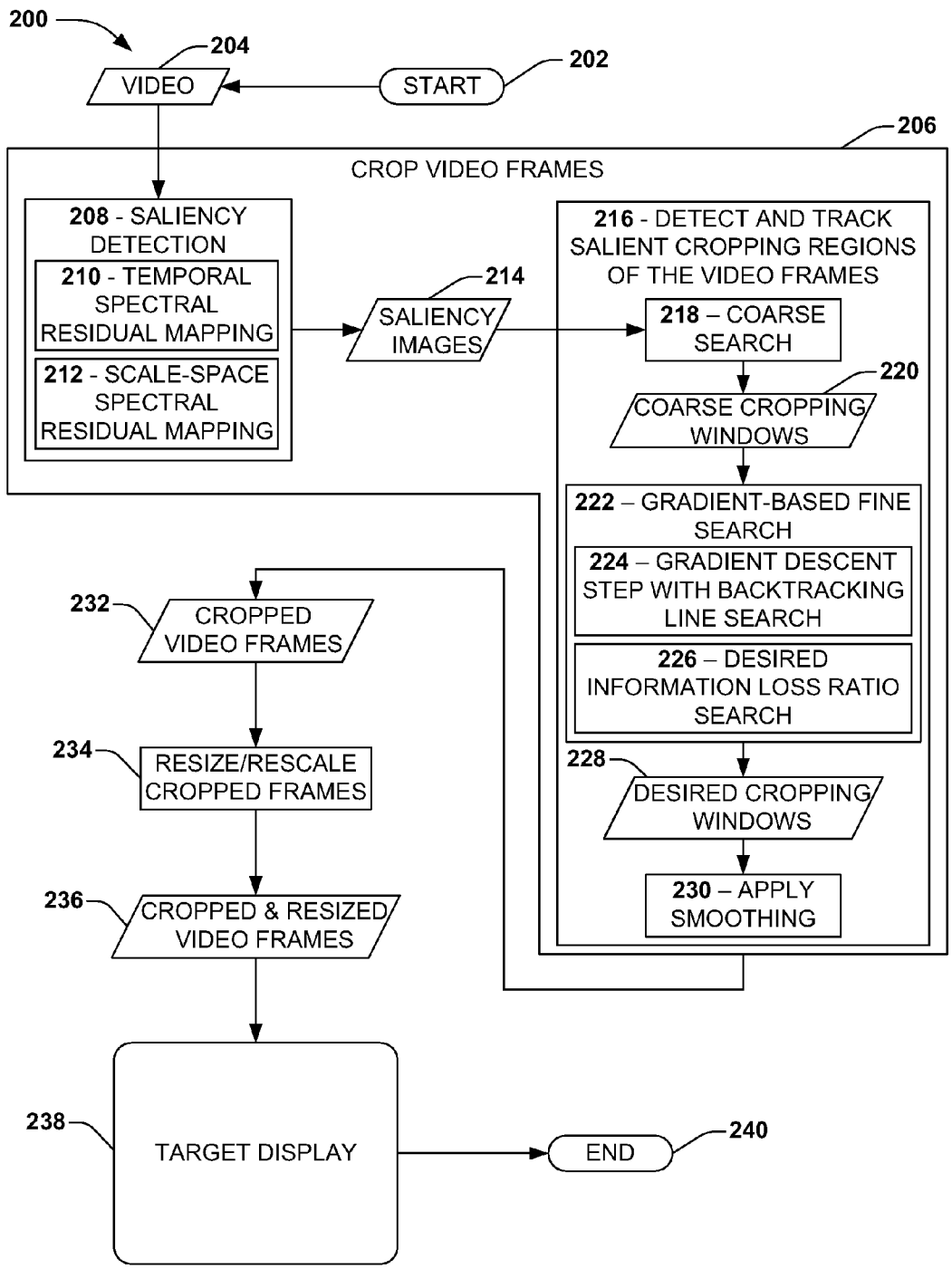
FIG. 2 is a flow diagram illustrating another exemplary method for retargeting a video to a target display.

One example of the embodiment described above is shown in FIG. 2. Exemplary method 200 begins at 202 and involves cropping video frames of a video 204 at 206. The cropping begins at 208 and involves saliency detection for the respective video frames to produce saliency images 214. At 210, temporal spectral residual mapping occurs, which involves combining phase spectrum information from a series of consecutive video images. At 212, scale-space spectral residual mapping occurs, which involves combining phase spectrum information from a series of different scale sizes of a video frame. After saliency images 214 are generated for respective video frames, salient cropping regions of the respective video frames are detected and tracked to generate cropped video frames 232 at 216. The detection and tracking begins at 218 and involves a coarse search for one or more coarse salient cropping windows 220 in the respective saliency images of the respective video frames. At 222, the saliency images, along with the respective coarse salient cropping window information, are subjected to a gradient-based fine search for desired cropping windows of the respective salient images. At 224, the gradient-based fine search involves a gradient descent step with backtracking search, and a search for a desired video spatial information loss to video resolution information loss ratio cropping window at 226. The gradient-based fine search 222 produces a respective desired cropping window 226 for the respective video frames based on the saliency images 214. At 230, predetermined smoothing parameters, and/or moving average smoothing parameters, may be applied to the desired cropping windows for the respective video frames. At 234, the cropped video frames 232 are isotropically resized to fit the target display, and the cropped and resized video frames 236 may be sent to the target display 238. Having cropped and resized the video frames of the video 204, the exemplary method 200 ends at 240.

Figure 3:
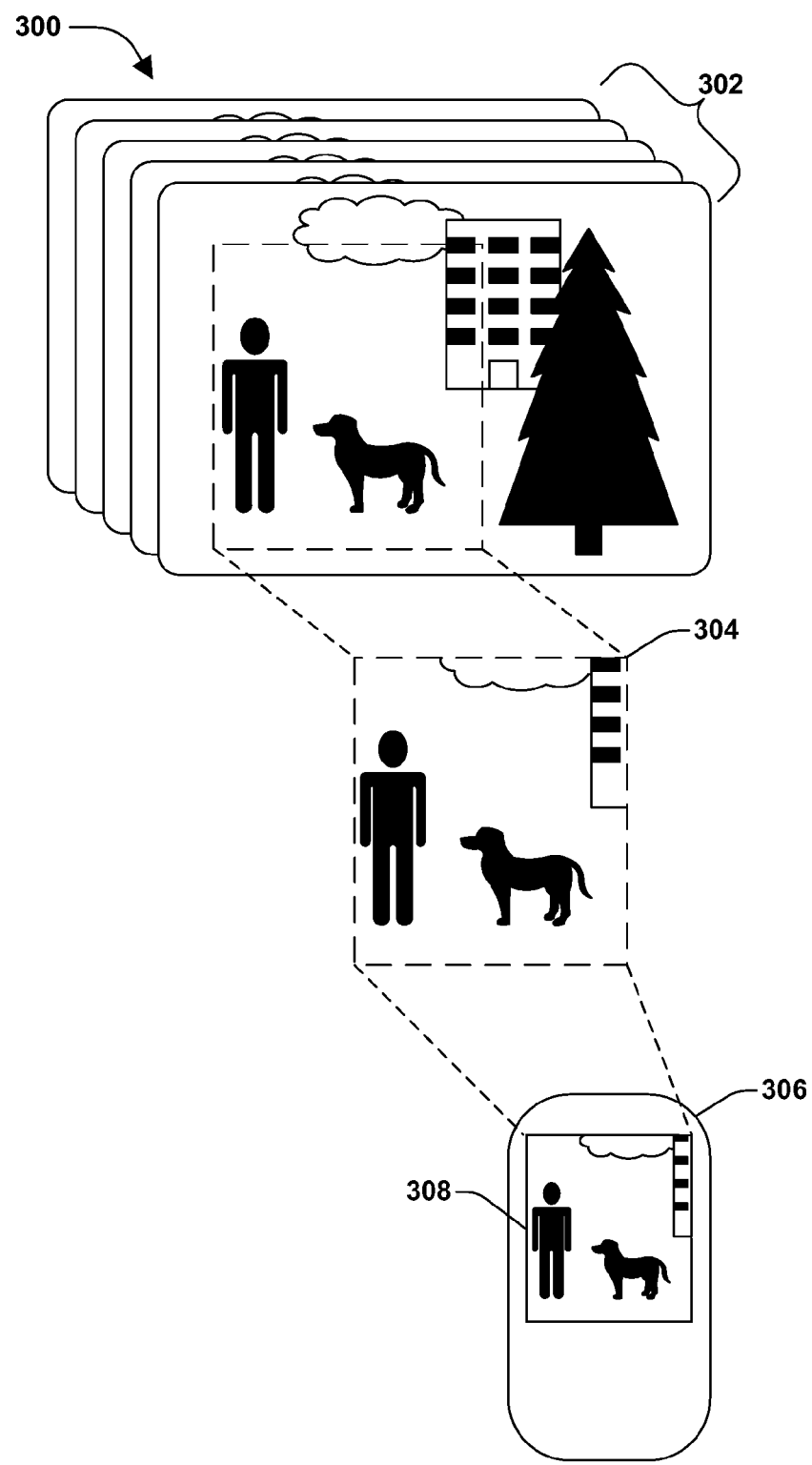
FIG. 3 is an illustration of an exemplary method and system for distortion free video retargeting.

In one embodiment of the techniques and systems described herein, a video may be retargeted to a device's display screen. As an example, a video may be sent to a handheld device (e.g., a mobile phone), and a user may wish to view the video on the device's display screen. In this example, if the device's display screen has a different aspect ratio and display size than the original video, direct scaling to fit the display screen may result in geometric distortion and resolution loss of the video. However, using the techniques and systems described herein, FIG. 3 illustrates an example 300 of distortion-free retargeting of a video. In the example 300, the video's frames 302 are individually cropped using a cropping area with a same aspect ratio as the target device's display 308. Respective video frames are cropped 304 based on saliency determinations for the respective video frames (e.g., the most likely salient area of an individual video frame; where the action may be occurring that is likely of most interest to a viewer). Cropped video frames 304, which have the same aspect ratio as the target device's display 308, are resized isotropically (e.g., scaled down while maintaining the same aspect ratio) to match a size of the display 308 on the target device 306 (e.g., a mobile phone). In this example, the video may be viewed on the handheld device with little to no geometric distortion and little to no resolution loss.

Figure 4:
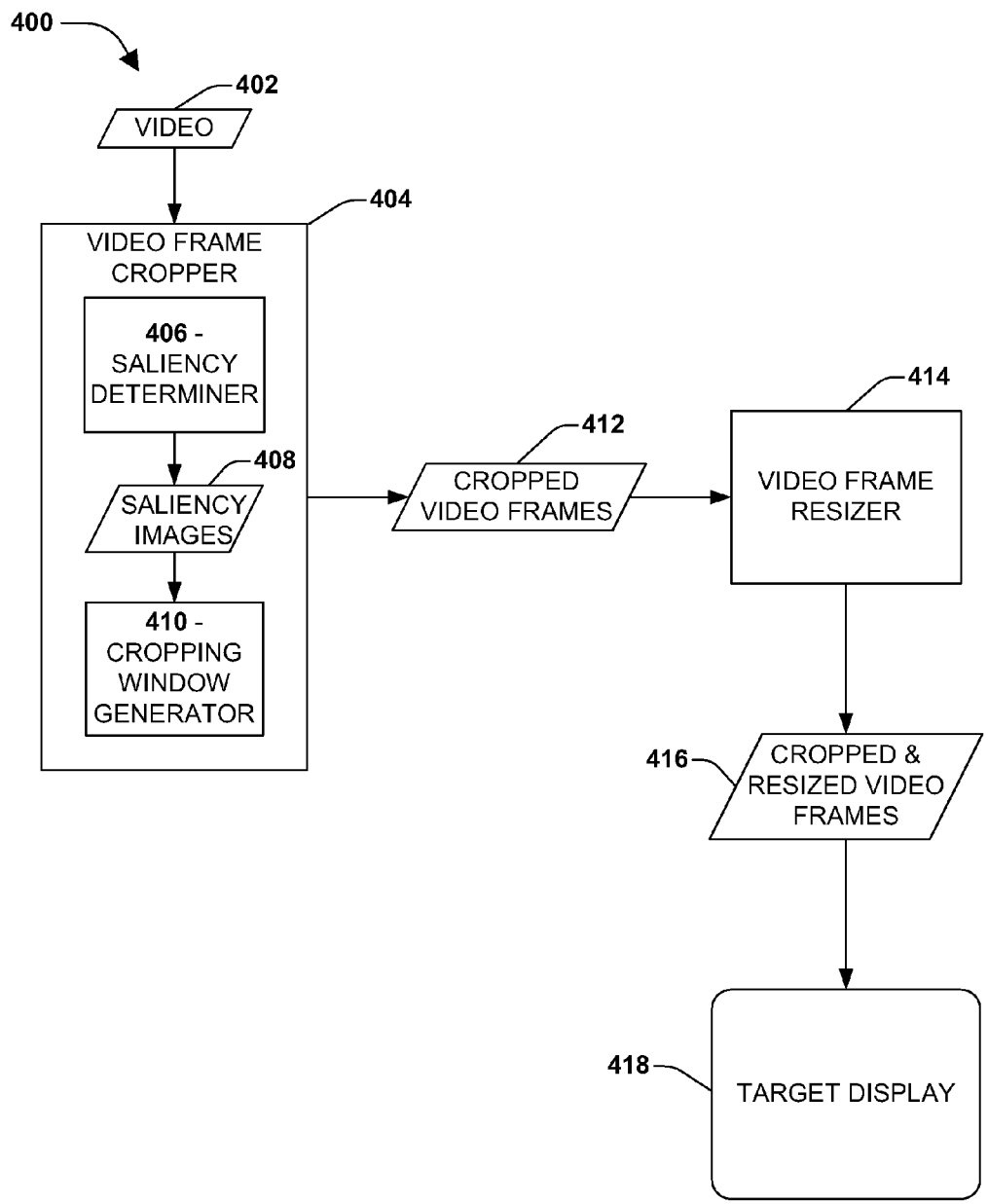
FIG. 4 is a block diagram of an exemplary system for retargeting a video to a target display.

A system may be configured for video retargeting, for example, such that when a user wishes to view a video on a device with a display having a different size and aspect ratio than the video, the video can be retargeted to the device's display with little to no distortion. An embodiment of a system for video retargeting is illustrated in FIG. 4. In exemplary system 400, a video 402 is sent to a video frame cropper 404, which is configured to generate cropped video frames 412 of the video 402 having a same aspect ratio as a target display 418. The video frame cropper 404 is operably coupled with a saliency determiner 406, which is configured to generate saliency images 408 of respective video frames of the video 402. Further, the video frame cropper 404 is operably coupled with a cropping window generator 410, which is configured to temporally detect and track salient cropping regions of the respective video frames. The cropped video frames 412 generated by the video frame cropper 404 are sent to a video frame resize 414, which is configured to isotropically resized the cropped video frames 412 to match a size of the target display 418. Respective cropped and resized video frames 416 of the video 402 are sent to the target display 418, where they may be viewed.

Figure 5:
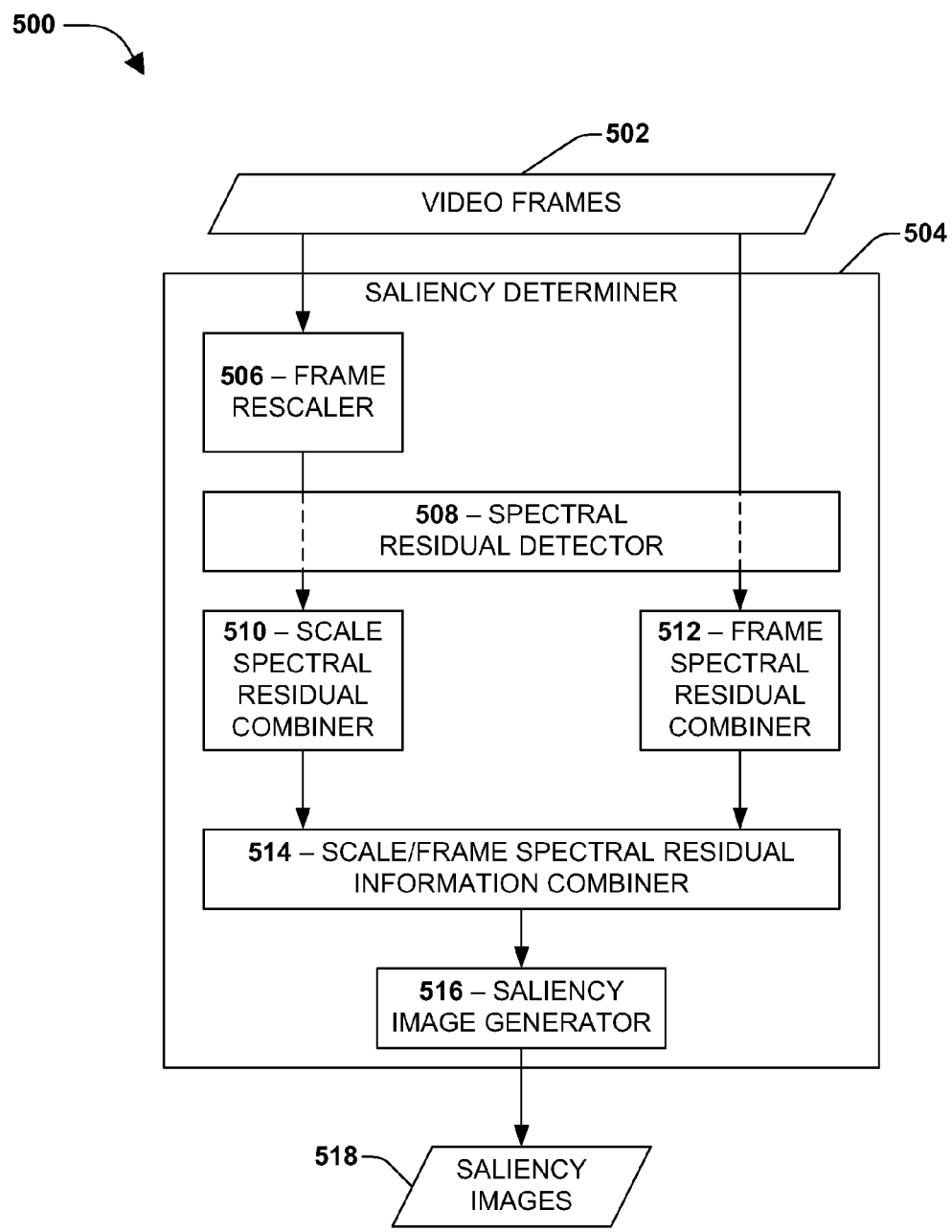
FIG. 5 is a block diagram of a portion of an exemplary system for generating saliency images for video frames.

One embodiment of a portion of this system is illustrated in FIG. 5 by an exemplary system 500. Video frames 502 are sent to a frame rescaler 506, in a saliency determiner 504. The frame rescaler 506 is configured to generate a plurality of different video frame scale sizes of respective video frames and send them through a spectral residual detector 508. The spectral residual detector 508 detects a plurality of phase spectrum information from the respective different video frame scale sizes of respective video frames, and sends phase spectrum information from the respective different video frame scale sizes of respective video frames to a scale spectral residual combiner 510. The scale spectral residual combiner 510 combines phase spectrum information from different video frame scale sizes for respective video frames, and sends combined scale phase spectrum information for respective video frames to a scale/frame spectral residual information combiner 514. Video frames 502 are also sent to the spectral residual detector 508, in the saliency determiner 504, where a plurality of phase spectrum information for respective video frames is generated. The phase spectrum information for respective video frames 502 is sent to a frame spectral residual combiner 512, which combines phase spectrum information from a series of consecutive video frames and sends combined phase spectrum information from a series of consecutive video frames to the scale/frame spectral residual information combiner 514. The scale/frame spectral residual information combiner 514 combines scale phase spectrum information and frame phase spectrum information for respective video frames 502 and sends the combined scale/frame phase spectrum information to a saliency image generator 516. The saliency image generator 516 uses the combined scale/frame phase spectrum information to generate saliency images 518 for respective video frames 502.

Figure 6:
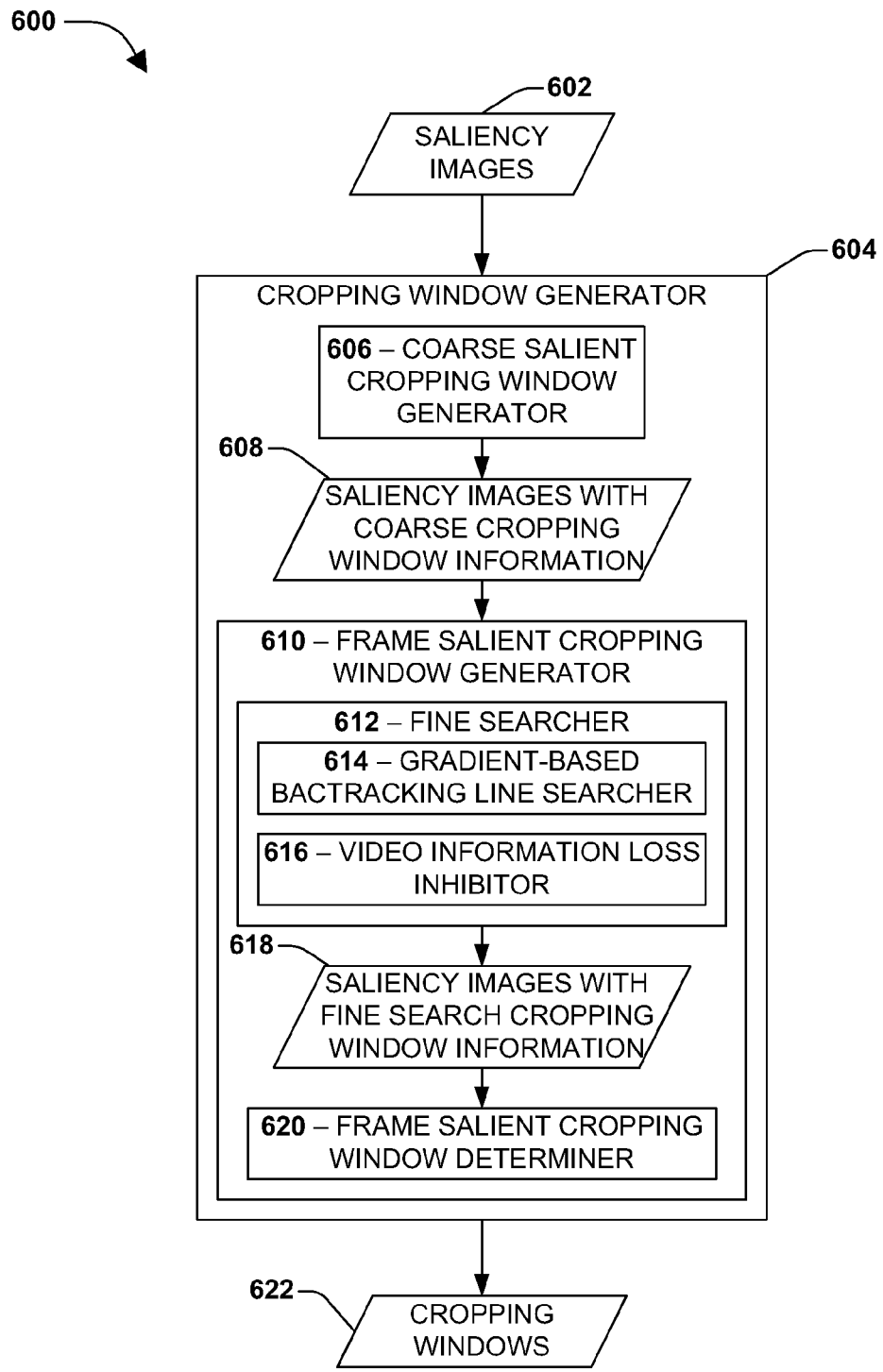
FIG. 6 is a block diagram of a portion of an exemplary system for generating cropping windows for video frames.

Another embodiment of a portion of this system is illustrated in FIG. 6 by an exemplary system 600. Saliency images 602 are sent to a cropping window generator 604. In the cropping window generator 604 a coarse salient cropping window generator 606 performs a coarse search of respective saliency images for one or more potential cropping windows for respective saliency images, and generates coarse cropping window information for respective saliency images 608. The saliency images with coarse cropping window information 608 are sent to a frame salient cropping window generator 610, which is operably coupled with a fine searcher 610. The fine searcher 610 utilizes a gradient-based backtracking line searcher 614 to perform a gradient descent step with backtracking line search of the coarse cropping window information for respective saliency images 608, and a video information loss inhibitor 616 to select a cropping window with a desirable ratio of video spatial information loss to video resolution information loss. Saliency images with fine search cropping information 618 are sent to a frame salient cropping window determiner 620, which selects cropping windows 622 for respective video frames, based on the saliency images 602.

Figure 7:
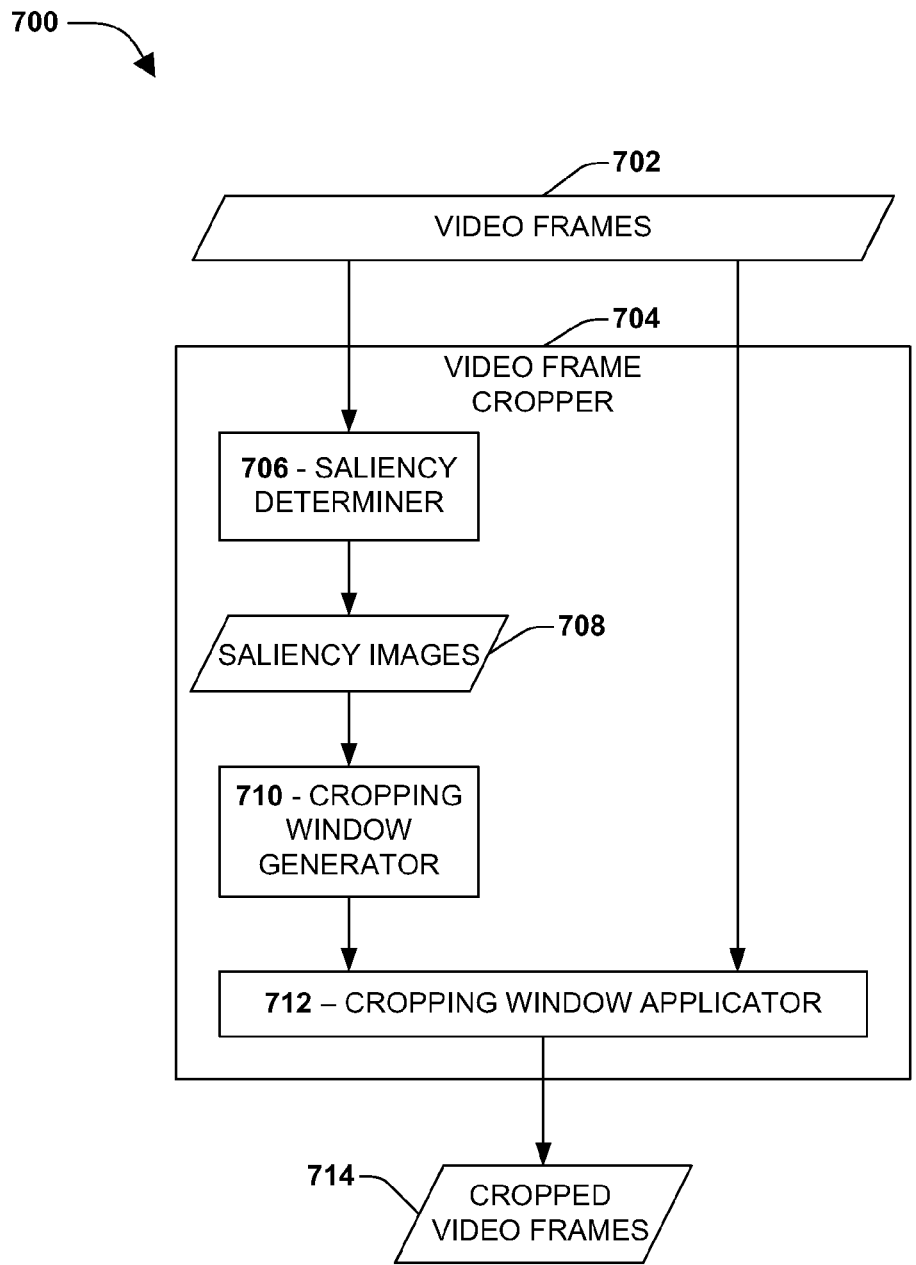
FIG. 7 is a block diagram of a portion of an exemplary system for generating cropped video frames for respective video frames.

Another embodiment of a portion of this system is illustrated in FIG. 7 by an exemplary system 700. Video frames 702 are sent to a video frame cropper 704, which is configured to generate cropped video frames 714 for the respective video frames 702 having a same aspect ratio as a target display. In the video frame cropper 704, video frames are sent to a saliency determiner 706, which is configured to generate saliency images 708 of respective video frames 702. The saliency images 708 are sent to a cropping window generator 710, in the video frame cropper 704, which is configured to temporally detect and track salient cropping regions of the respective video frames. The salient cropping regions are sent to a cropping window applicator 712, in the video frame cropper 704, which also receives video frames 702. The cropping window applicator 712 crops the video frames 702 using the respective salient cropping regions to generate cropped video frames 714.

Figure 8:
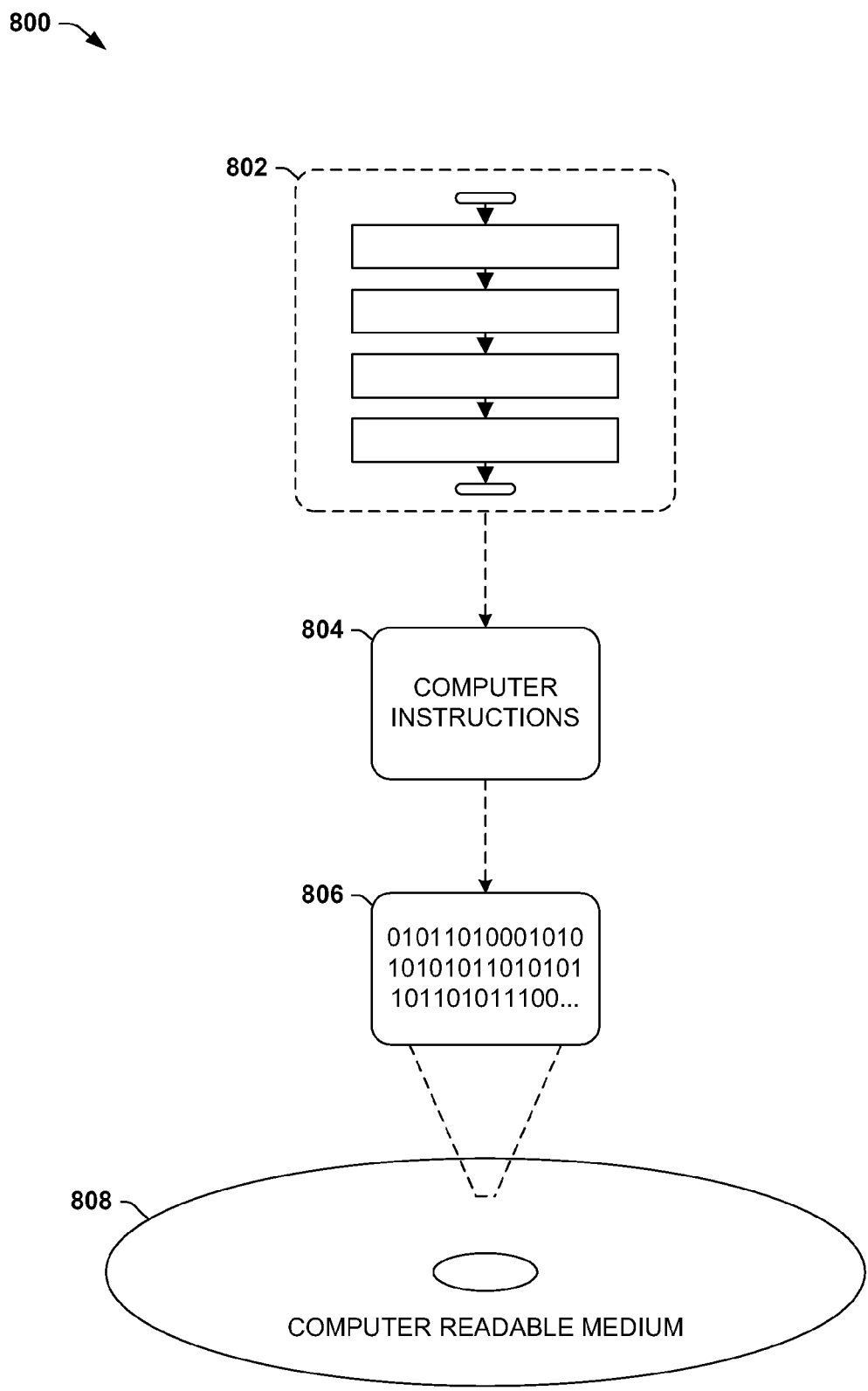
FIG. 8 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802 for retargeting video to a target display, such as the method 100 of FIG. 1, for example. Many such computer-readable media may be devised by those of ordinary skill in the art that are configured to operate in accordance with the techniques presented herein.

Figure 9:
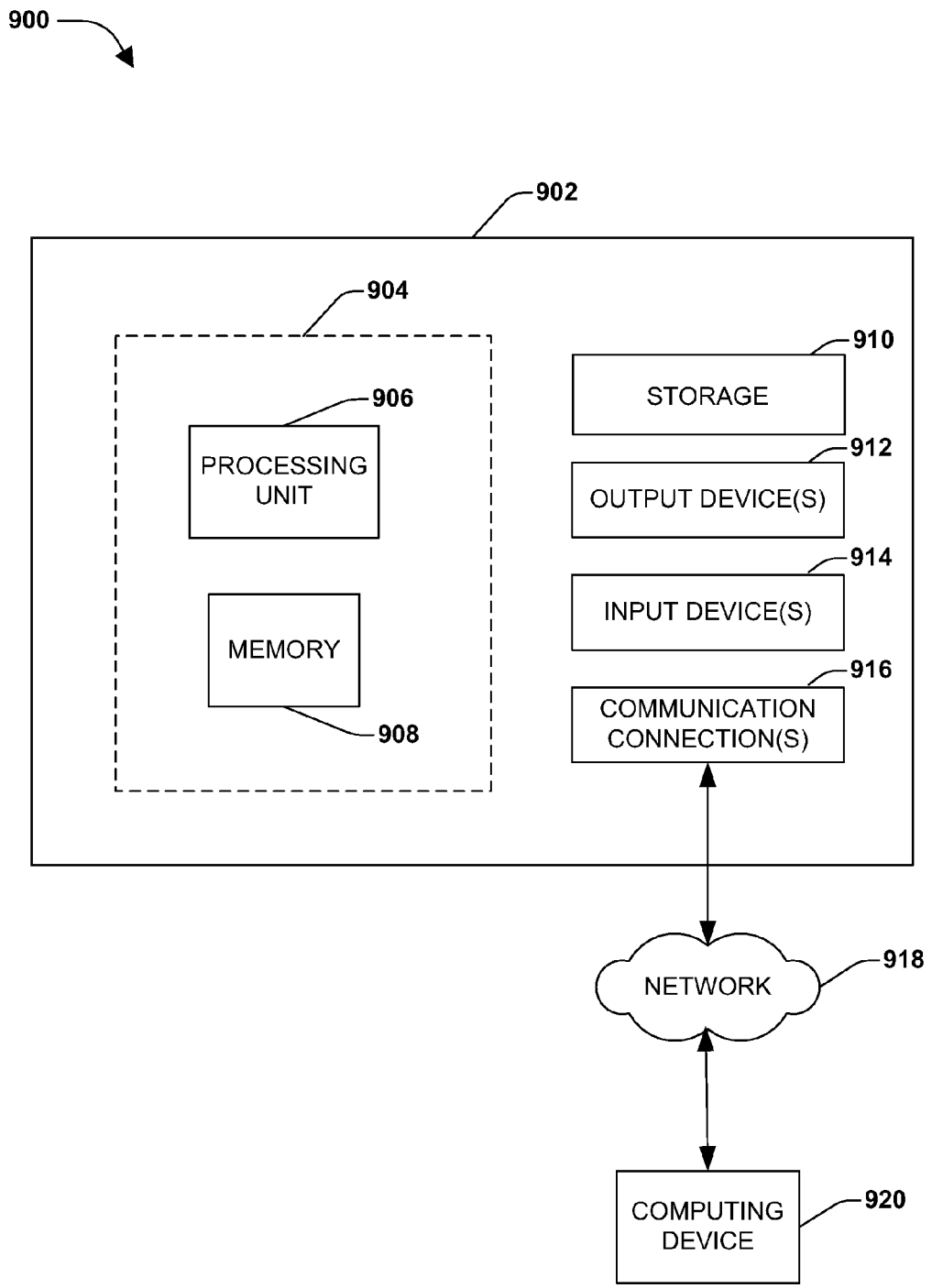
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments for retargeting videos are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, for transforming a video to a target display, the method comprising:
cropping respective frames of the video using one or more cropping windows with a same aspect ratio as the target display, the cropping comprising:
temporally detecting and tracking one or more salient cropping regions of the respective frames of the video based at least in part upon a weighted average, associated with zooming, based at least in part upon information from a consecutive sequence of frames, where information from a first video frame counts less toward the weighted average than information from a second video frame when the first video frame is older than the second video frame and where the information from the second video frame counts less toward the weighted average than information from a third video frame when the second video frame is older than the third video frame.

2. The method of claim 1, the cropping comprising using extended spectral residual saliency detection.

3. The method of claim 2, using extended spectral residual saliency detection comprising determining saliency using phase spectrum information from a combination of frames from the video.

4. The method of claim 2, using extended spectral residual saliency detection comprising determining saliency using phase spectrum information from a combination of scaled frames from the video.

5. The method of claim 1, the target display comprised on a handheld mobile device.

6. The method of claim 1, temporally detecting and tracking comprising determining one or more desired cropping windows for the respective frames of the video using a coarse to fine search.

7. The method of claim 6, determining one or more desired cropping windows for the respective frames of the video using a coarse to fine search comprising:
performing a coarse search over one or more of the respective frames of the video; and
performing a gradient-based fine search based on results of the course search.

8. The method of claim 7, performing a gradient-based fine search comprising using a gradient descent step with a backtracking line search.

9. The method of claim 7, performing a gradient-based fine search comprising determining a cropping window with an optimal video spatial information loss to video resolution information loss ratio.

10. The method of claim 1, temporally detecting and tracking comprising using one or more smoothing cropping parameters.

11. The method of claim 10, the one or more smoothing cropping parameters comprising one or more motion smoothness constraints.

12. The method of claim 11, the one or more motion smoothness constraints comprising at least one of:
a zooming speed constraint;
a zooming acceleration constraint;
a maximum motion speed; or
a maximum motion acceleration.

13. The method of claim 10, using one or more smoothing cropping parameters comprising using an exponential moving average scheme.

14. A system, implemented at least in part via a processing unit, for transforming a video to a target display, the system comprising:
a video frame cropper configured to crop respective video frames of the video to a same aspect ratio as the target display, the video frame cropper comprising:
a cropping window generator configured to temporally detect and track one or more salient cropping regions of the respective video frames based at least in part upon a weighted average that is a function of information from a consecutive sequence of frames, where information from a first video frame counts less toward the weighted average than information from a second video frame when the first video frame is older than the second video frame and where the information from the second video frame counts less toward the weighted average than information from a third video frame when the second video frame is older than the third video frame.

15. The system of claim 14, comprising a saliency determiner configured to generate saliency images of the respective video frames, comprising:
a frame rescaler configured to create a plurality of different sizes of a video frame;
a spectral residual detector configured to detect phase spectrum information from a video frame;
a scale spectral residual combiner configured to combine phase spectrum information from multiple different sizes of a video frame; and
a frame spectral residual combiner configured to combine phase spectrum information from a sequence of consecutive video frames.

16. The system of claim 15, comprising:
a scale/frame spectral residual information combiner configured to combine information from the scale spectral residual combiner and the frame spectral residual combiner for the respective video frames; and
a saliency image generator configured to generate a saliency image for the respective video frames.

17. The system of claim 14, the cropping window generator comprising:
a coarse salient cropping window generator configured to generate coarse cropping window information for a saliency image of a video frame;
a frame salient cropping window generator configured to generate fine search cropping window information for the saliency image of the video frame; and
a frame salient cropping window determiner configured to determine a cropping window for the saliency image of the video frame.

18. The system of claim 17, the coarse salient cropping window generator configured to perform a coarse search for one or more coarse salient cropping windows of the saliency image of the video frame.

19. The system of claim 14, the video frame cropper comprising a cropping window applicator configured to:
apply a cropping window to a video frame; and
generate a cropped video frame.

20. A computer readable storage device comprising instructions that when executed perform a method for transforming a video to a target display, the method comprising:

cropping respective frames of the video using a cropping area with a same aspect ratio as the target display, the cropping comprising:

temporally detecting and tracking salient cropping regions of the respective frames of the video based at least in part upon a weighted average, where information from a first video frame counts less toward the weighted average than information from a second video frame when the first video frame is older than the second video frame and where the information from the second video frame counts less toward the weighted average than information from a third video frame when the second video frame is older than the third video frame.

* * * * *